United States Patent [19]
Karp et al.

[11] Patent Number: 5,093,916
[45] Date of Patent: Mar. 3, 1992

[54] SYSTEM FOR INSERTING CONSTRUCTS INTO COMPILED CODE, DEFINING SCOPING OF COMMON BLOCKS AND DYNAMICALLY BINDING COMMON BLOCKS TO TASKS

[75] Inventors: Alan H. Karp, Bowie, Md.; Randolph G. Scarborough, Palo Alto, Calif.; Alfred W. Shannon, Morgan Hill, Calif.; Jin-Fan Shaw, San Jose, Calif.; Leslie J. Toomey, Rhinebeck, N.Y.

[73] Assignee: International Business Machines Corporation, Armonk, N.Y.

[21] Appl. No.: 197,060

[22] Filed: May 20, 1988

[51] Int. Cl.⁵ ............................................. G06F 7/00
[52] U.S. Cl. ............................... 395/700; 364/DIG. 1; 364/DIG. 2; 364/280.4; 364/280; 364/973
[58] Field of Search ... 364/200 MS File, 900 MS File

[56] References Cited

U.S. PATENT DOCUMENTS

| | | | |
|---|---|---|---|
| 3,972,026 | 7/1976 | Waitman et al. | 364/900 |
| 4,030,078 | 6/1977 | Klüge | 364/900 |
| 4,156,910 | 5/1979 | Barton et al. | 364/200 |
| 4,307,446 | 12/1981 | Barton et al. | 364/200 |
| 4,344,134 | 8/1982 | Barnes | 364/200 |
| 4,390,945 | 6/1983 | Olsen et al. | 364/900 |
| 4,447,875 | 5/1984 | Bolton et al. | 364/200 |

Primary Examiner—Thomas C. Lee
Assistant Examiner—Mehmet Geckil
Attorney, Agent, or Firm—R. Bruce Brodie

[57] ABSTRACT

A method performed within a multi-processing, multi-programming computer environment for reducing conflict among tasks concurrently accessing COMMON BLOCKs in code sequences compiled within said environment from a FORTRAN like language system, and for reducing the memory used in the storing of private copies of said COMMON BLOCKs. The method involves inserting constructs at compile time into the compiled code which enable the COMMON BLOCKs to be dynamically bound at runtime to two or more referencing tasks. Then, at execution time responsive to the constructs, the blocks are bound to the tasks dynamically and scoped so that they lie within the dynamic nesting of the tasks.

6 Claims, 6 Drawing Sheets

```
        TOTAL = 0

PARALLEL LOOP 100 INDEX = IINIT,ITERM,IINCR
            PRIVATE(SUM)
          DOFIRST
            SUM = 0
          DOEVERY
            SUM = SUM + A(I)*B(I)
          DOFINAL LOCK
            TOTAL = TOTAL + SUM
100       CONTINUE
```

EXAMPLE OF A PARALLEL LOOP

Fig. 1

```
        PARALLEL CASES
           PRIVATE(...variables...)
        CASE 1
           ...statements...
        CASE 2
           ...statements...
        CASE 3
           ...statements...
        CASE 4, WAITING FOR CASES (1,2)
           ...statements...
        CASE 5, WAITING FOR CASES (1,3)
           ...statements...
        CASE 6
           ...statements...
        CASE 7
           ...statements...
        CASE 8, WAITING FOR CASES (5,7)
           ...statements...
        CASE 9

END CASES
```

EXAMPLE OF PARALLEL CASES

Fig. 2

```
      DO 100 I = 1,N
      A(I) = B(I)*C(I)*D(I)
      E(I) = SQRT(ALOG(F(I)))
      P(I) = Q(I)**R(I) + S(I)**T(I)
      U(I) = V(I)/W(I) + X(I)/Y(I)
  100 CONTINUE
```

DO-LOOP SUITABLE FOR AUTOMATIC PARALLELIZATION

Fig. 3

```
      PARALLEL LOOP 100 I = 1,N
      A(I) = B(I)*C(I)*D(I)
      E(I) = SQRT(ALOG(F(I)))
      P(I) = Q(I)**R(I) + S(I)**T(I)
      U(I) = V(I)/W(I) + X(I)/Y(I)
  100 CONTINUE
```

TRANSLATION OF THE DO-LOOP OF
FIGURE 3 INTO A PARALLEL LOOP

Fig. 4

```
      PARALLEL CASES
      CASE
         DO 101 I = 1,N
  101       A(I) = B(I)*C(I)*D(I)
      CASE
         DO 102 I = 1,N
  102       E(I) = SQRT(ALOG(F(I)))
      CASE
         DO 103 I = 1,N
  103       P(I) = Q(I)**R(I) + S(I)**T(I)
      CASE
         DO 104 I = 1,N
  104       U(I) = V(I)/W(I) + X(I)/Y(I)
      END CASES
```

TRANSLATION OF THE DO-LOOP OF
FIGURE 3 INTO PARALLEL CASES

Fig. 5

```
        PARALLEL CASES
        CASE
           PARALLEL LOOP 101 I = 1,N
   101     A(I) = B(I)*C(I)*D(I)
        CASE
           PARALLEL LOOP 102 I = 1,N
   102     E(I) = SQRT(ALOG(F(I)))
        CASE
           PARALLEL LOOP 103 I = 1,N
   103     P(I) = Q(I)**R(I) + S(I)**T(I)
        CASE
           PARALLEL LOOP 104 I = 1,N
   104     U(I) = V(I)/W(I) + X(I)/Y(I)
        END CASES
```

TRANSLATION OF THE DO-LOOP OF
FIGURE 3 INTO BOTH PARALLEL
CASES AND PARALLEL LOOPS

Fig. 6

```
C       ORIGINATE SOME TASKS
        DO 100 I = 1,5
  100 ORIGINATE ANY TASK IDTASK(I)

C       COMPUTE EACH PLANE OF THE ARRAY A USING A TASK
        DO 200 I=1,1000
  200 DISPATCH ANY TASK ITASK, CALLING COMPUT(A(1,1,I))

C       ENSURE ALL COMPUTATIONS ARE COMPLETE
  300 WAIT FOR ALL TASKS

C       TERMINATE THE TASKS
        DO 400 I = 1,5
  400 TERMINATE TASK IDTASK(I)
```

EXAMPLE OF OUT-OF-LINE PARALLEL LANGUAGE

Fig. 7

```
@PROCESS DC(INIT,EVAL,DATA)
      PARAMETER (N=100,NTASKS=5)
      COMMON/INIT/H(N),T(N),P(N)
      COMMON/EVAL/EVEC(N),EMAT(N,N)
      COMMON/DATA/X(N),Y(N),AVAL(N,N)
      INTEGER IDTASK(NTASKS)

C     SET UP FOR CALCULATION
      DO 10 I=1,N
      H(I) = ...
      T(I) = ...
   10 P(I) = ...

C     ORIGINATE TASKS FOR PARALLEL EXECUTION
      DO 20 I=1,NTASKS
   20 ORIGINATE ANY TASK IDTASK(I)

C     EVALUATE INDPENENDENT COLLECTIONS OF DATA IN PARALLEL
      DO 30 K=1,N
C     PREPARE DATA FOR PARALLEL
      READ (1) X,Y
      DO 33 J=1,N
      DO 33 I=1,N
   33 AVAL(I,J) = FUNCXY(X(I),Y(J))
C     EVALUATE DATA IN PARALLEL
      DISPATCH ANY TASK ITASK,
     *      SHARING (INIT,EVAL),
     *      COPYINGI(DATA),
     *      CALLING EIGEN(=K)
   30 CONTINUE

C     WAIT FOR PARALLEL EXECUTION TO COMPLETE
   40 WAIT FOR ALL TASKS

C     RETURN COMPUTED RESULTS
   50 WRITE (2) EVEC,EMAT
      STOP
      END
```

EXAMPLE SHOWING HOW CONFLICTS BETWEEN COMMON
BLOCKS ARE REDUCED BY DYNAMIC BINDING
(PART I)

Fig. 8

```
@PROCESS DC(INIT,EVAL,DATA)
      SUBROUTINE EIGEN(K)
      PARAMETER (N=100,NHELPS=3)
      COMMON/INIT/H(N),T(N),P(N)
      COMMON/EVAL/EVEC(N),EMAT(N,N)
      COMMON/DATA/X(N),Y(N),AVAL(N,N)
      INTEGER IDTASK(NHELPS),IFIRST/0/

C     ON FIRST DISPATCH ORIGINATE SOME HELPING SUBTASKS
      IF (IFIRST.EQ.0) THEN
         DO 10 I=1,NHELPS
   10    ORIGINATE ANY TASK NHELPS(I)
         IFIRST=1
      ENDIF

C     MANIPULATE DATA PROVIDED BY CALLER
      DO 20 J=1,N
      DO 20 I=1,N
   20 AVAL(I,J) = FUNCTP(X(I),Y(J),T(I),P(I),AVAL(I,J))

C     EVALUATE SUBDATA IN PARALLEL
      DO 30 J=1,N
      DISPATCH ANY TASK ITASK,
     *     SHARING (INIT,EVAL,DATA),
     *     CALLING SOLVE(=K,=J)

30 CONTINUE

C     WAIT FOR PARALLEL EXECUTION TO COMPLETE
   40 WAIT FOR ALL TASKS

C     RETURN COMPUTED RESULTS
   50 EVEC(K) = ...
      END

@PROCESS DC(INIT,EVAL,DATA)
      SUBROUTINE SOLVE(K,J)
      PARAMETER (N=100)
      COMMON/INIT/H(N),T(N),P(N)
      COMMON/EVAL/EVEC(N),EMAT(N,N)
      COMMON/DATA/X(N),Y(N),AVAL(N,N)

C     MANIPULATE DATA PROVIDED BY CALLER
      DO 10 I=1,N
   10 AVAL(I,J) = FUNCTH(X(I),Y(J),T(I),H(I),AVAL(I,J))

C     RETURN COMPUTED RESULTS
   20 EMAT(J,K) = ...
      END
```

EXAMPLE SHOWING HOW CONFLICTS BETWEEN COMMON
BLOCKS ARE REDUCED BY DYNAMIC BINDING
(PART II)

Fig. 9

SYSTEM FOR INSERTING CONSTRUCTS INTO COMPILED CODE, DEFINING SCOPING OF COMMON BLOCKS AND DYNAMICALLY BINDING COMMON BLOCKS TO TASKS

FIELD OF THE INVENTION

This invention relates to distributed computation and, more particularly, to the use of extensions in FORTRAN-like languages in order to permit several concurrent levels of parallel processing.

DESCRIPTION OF THE PRIOR ART

FORTRAN and Efficiency

T. W. Pratt, "Programming Languages: Design and Implementation", Prentice-Hall, Inc., copyright 1975, pages 237-241 and 314-338, succinctly summarizes the attributes of the compiled, computational language system FORTRAN. In this regard, Pratt points out that FORTRAN language design centers about one goal; namely, that of execution efficiency.

Attributes of FORTRAN

According to Pratt, a FORTRAN program consists of a main program and several subprograms. Each program and subprogram is compiled separately from the others, with the compiled programs being linked during loading. Significantly, each program is compiled into a strictly statically allocated area containing the machine code and the defined data areas. Shared data areas called "COMMON BLOCKs", each identified by a distinct name, may also be defined.

It is also a characteristic of FORTRAN that no runtime storage management is provided. Furthermore, the separately compiled subprograms comprising a linked and loaded program communicate only by accessing COMMON BLOCKs, passing parameters, and passing control through nonrecursive program calls. Almost the entire runtime structure is fixed during compilation. Only the values of simple variables and array elements vary during execution. The variables or arrays may be declared to lie in either a local or a global data referencing environment.

Ordinarily, simple variables and arrays are local to the subprogram to which they are declared and used. The local referencing environment is set up during compilation. During execution, the associations are activated on each entry and deactivated on each exit from the subprogram. Thus, whenever a subprogram is re-entered, all local variables and arrays have the values they had on the last exit.

COMMON BLOCKs and Shared Storage

If simple variables or arrays are to be "shared" between subprograms, they must be explicitly declared part of the global referencing environment. This global environment is set up in terms of COMMON BLOCKs, each having an identifier to distinguish it from others, and each containing possibly many variables and arrays. If two or more subprograms each contain a declaration for the same COMMON BLOCK, then the declared COMMON BLOCK would be accessible to both or all of them.

The effect of the COMMON BLOCK declaration is to allow the global referencing environment to be partitioned into distinct blocks, each with a name or identifier. However, each subprogram need not have access to all of the global environment. It must declare only those COMMON BLOCKs to which it requires access.

Two aspects of COMMON BLOCKs should now be noted. First, when a subprogram references a variable or array within a COMMON BLOCK, no ambiguity is possible. There is only one instance of that COMMON BLOCK defined in the execution environment. Second, this makes it possible to access the data within the COMMON BLOCK efficiently. Space for a pointer to the COMMON BLOCK may be compiled into the program. The actual address will be inserted into this space during the linking and loading of the program. The compiled executable code sequence needs simply to fetch this updated pointer, and it will have the actual location of the COMMON BLOCK.

Constructs in Runtime/Execution Environments

Aho et al, "Compilers: Principles, Techniques, and Tools", Addison-Wesley Publishing Co., copyright 1986, pages 446-448, 454-455, and 474-477, describe the runtime environments for compiled, sequentially executable code. According to Aho, each runtime environment includes constructs defining the state of each executing program and subprogram, and any nesting relationships among the executing objects.

Each execution of a program is referred to as an activation of the program. If the program is recursive, several of its activations may be alive at the same time. (The FORTRAN language does not provide for recursion, although some implementations exist which permit it.) New activations may create new instances of the variables known to a program. Variables which are automatic receive fresh instances with each activation.

Variables which are static either retain their existing (one) instance or, if the present activation is the first activation referencing the variable, obtain their initial (and only) instance. Global data such as COMMON BLOCKs retain their current instance or, under the ANSI FORTRAN 77 language standard, obtain their initial instance if being referenced for the first time on an activation tree.

The Runtime Activation Tree

A given subprogram may invoke further subprograms, causing them to become activated. At any moment, a tree may be used to represent the state of activations in a program. Each node is an activation of a subprogram; a node is an ancestor of another, if and only if, the ancestor activation is presently invoking the descendant, causing thereby its activation.

In a serial execution of a program, only one thing may be done at a time. A called descendant subprogram must complete before its calling ancestor subprogram can continue and call another descendant. It follows that each ancestor node in the tree can have only a single descendant node. Observed over time, the tree may lengthen or shorten, and the nodes on the tree may represent different subprograms, but the tree itself is always a straight line.

COMMON BLOCKs and the Activation Tree

The existing treatment of global data, in particular of FORTRAN COMMON BLOCKs, matches very well with this tree of activated subprograms. There is always only one instance of a given global data item, and there is always only a single line in the tree of activated subprograms. The need to share data up and down the tree--the purpose of global data is to share data across subprograms--is easily served on this single line by this single instance of the global data.

Parallel Processing

With the advent of computer systems providing more than one processor, it has become desirable to employ more than one processor in the computation of a single program. In the prior art, if a program contained subprograms directed to, for instance, matrix inversion or matrix multiplication, such subprograms have been made executable on single-instruction stream, single-datastream (SISD) machines; single-instruction stream, multiple-datastream (SIMD) machines; and other configurations, such as shared-memory multiple processor (MIMD) configurations.

An example of a method by which selected loops within nested DO-loops are identified as being amenable to parallel processing may be found in Scarborough, U.S. Pat. No. 4,710,872, "Method for Vectorizing and Executing on an SIMD Machine Outer Loops in the Presence of Recurrent Inner Loops", issued Dec. 1, 1987.

Parallel Processing Specified as a Serial Language Extension

R. H. Perrott, "Parallel Programming", Addison-Wesley Publishing Co., copyright 1987, chapters 10-11, pages 134-166, called attention to the fact that it is the sequential programming language which expresses the application, and it is the responsibility of the compiler to ascertain those portions of the program amenable to parallel execution.

Since a compiler ought not to change the behavior of the program, it must accept and employ the data referencing environment of the language of the program. Parallel computation does not create new definitions for data sharing. Rather, software executing in parallel mode should implement an existing definition of the data referencing environment.

To assist or direct a compiler in identifying those portions of an application amenable to parallel execution, extensions to computer languages have from time to time been made. Reference should be made to Gdaniec et al, U.S. Pat. No. 4,636,948, "Method for Controlling Execution of Application Programs Written in High Level Program Language", issued Jan. 13, 1987. Gdaniec covers FORTRAN extensions useful on shared-memory, multiple processor configurations such as the IBM 3090-200 and 3090-600E utilizing the IBM FORTRAN Multitasking Facility. Also, Perrott describes the Cray-1 FORTRAN Translator in chapter 10, and the CDC Cyber FORTRAN in chapter 11.

Classes of Parallel Processing Extensions to Serial Languages

The first type of language extension is termed "in-line". In-line extensions occur within a single subprogram and identify components of that subprogram which may be executed in parallel. A statement in a parallel component remains able to reference and define the variables known to the subprogram, including both local and global data. There is no fundamental change to the data referencing environment of the executing program.

The second type of language extension is termed "out-of-line". Out-of-line extensions create new data environments and execute entire subprograms independently under that data environment. The degree to which the new and old data environments are coupled varies in the various prior art implementations.

Limitations of Prior Art Extensions

The use of the out-of-line FORTRAN language extensions for parallel processing in the above-named prior art suffers the limitation that only a single level of parallelism is supported. This means that once a task has split itself into parallel subtasks, the subtasks cannot further be split into additional parallel subtasks. This is a severe restriction which limits the development and use of libraries. A library program written to exploit out-of-line parallel processing cannot be called from any program executing in parallel. Programs intended for library use must therefore avoid the use of out-of-line parallel execution.

SUMMARY OF THE INVENTION

It is an object of this invention to devise a method for reducing conflict among tasks concurrently accessing COMMON BLOCKs in code sequences compiled from a FORTRAN-like language system, for facilitating the use of COMMON BLOCKs in multilevel parallel execution, and for reducing the memory used in the storing of private copies of said COMMON BLOCKs.

The satisfaction of the above object is based upon the unexpected observation that conflict can be avoided by scoping the binding of a COMMON BLOCK to a task so that it lies within the dynamic nesting structure of executing tasks. That is, a COMMON BLOCK itself is made a multilayered dynamic object with dynamic scoping.

The steps of the inventive method more particularly comprise (a) dynamically binding at least one COMMON BLOCK to a subtask at the time of initial subtask invocation as specified by a superior task, including recording a pointer to said COMMON BLOCK in the subtask description; and (b) updating pointers in the subtasks to the location of the copy of the COMMON BLOCK known to the invoking superior task.

BRIEF DESCRIPTION OF THE DRAWING

FIG. 1 depicts the use of a FORTRAN language extension denominated as an in-line PARALLEL LOOP statement.

FIG. 2 sets out the use of another FORTRAN language extension denominated as in-line PARALLEL CASES and related statements.

FIG. 3 shows the use of a typical FORTRAN DO-loop suitable for automatic parallelization.

FIGS. 4-6 illustrate the transformation of the DO-loop of FIG. 3 into the in-line PARALLEL LOOP, PARALLEL CASES, and mixed LOOP and CASE, respectively.

FIG. 7 illustrates several of the functions of the out-of-line parallel language.

FIGS. 8 and 9 show how dynamic binding reduces conflict between COMMON BLOCKs in parallel execution environments.

DESCRIPTION OF THE PREFERRED EMBODIMENT

Figure 10:
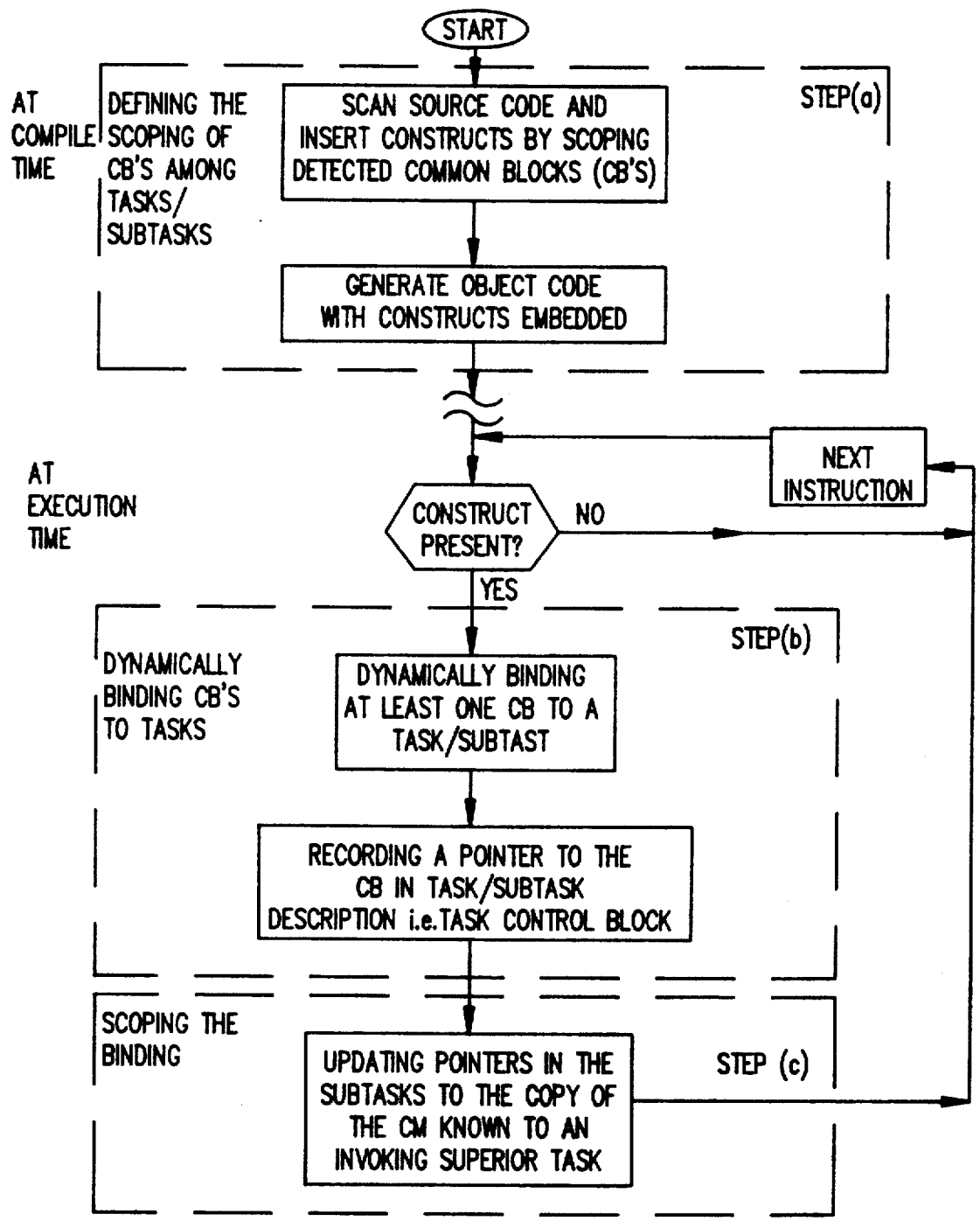
FIG. 10 is a flow of control depiction of the steps of the method of the invention.

The method of this invention can be used in a multiprocessing, multi-programming system of the IBE system/370 type as for example described in Amadhl et al., U.S. Pat. No. 3,400,371, "Data Processing System", issued Sept. 3, 1968. The IBM System/370 as described in the Amdahl patent includes as a resource, all of the facilities of either the computing system or of an operating system running thereon which are required for the execution of processes or tasks including the method of this invention. Typical resources comprise main store, I/O devices, the CPU, data sets, and control or processing programs. Furthermore, such systems are capable of multi-programming. This means the concurrent execution of two or more processes or tasks by the computing system. An operating system supporting this aspect is described in IBM publication GC28-6646, July 1973.

Amdahl also describes the necessary operating system environment by which procedural or imperative language source code sequences can be processed to produce object code, the latter being executable in such a system. It is usual for such systems to have resident high level procedural language compilers such as FORTRAN, PL/1, PASCAL, ALGOL, ADA or their equivalents. The IBM VS FORTRAN compiler is illustrative of the procedural language source-to-object code converter to which this invention may be applied.

Also, reference can be made to Scarborough, U.S. Pat. No. 4,710,872, "Methods for Vectorizing and Executing in an SIMD Machine Outer Loops in the Presence of Recurrent Inner Loops", issued Dec. 1, 1987, for a description of a method utilizing a FORTRAN compiler and executing in an IBM System/370 environment.

The description of a preferred embodiment includes a description of:

(1) extensions to the FORTRAN language to permit dynamic specification of the work to be done in parallel, (2) dynamic binding of COMMON BLOCK addresses to permit the sharing or nonsharing of COMMON BLOCK data between parallel regions of a program, (3) integrating in-line (loop-oriented or case-oriented) parallel execution with out-of-line (subroutine-oriented) parallel execution, and (4) queuing of statements requesting parallel work dynamically occurring in a parallel program for execution occurring in a parallel program for execution on a multiprocessor without requiring that processors be dedicated.

Referring now to FIG. 10, there is depicted a flow of control of the three principal steps (a-c) of the method of this invention. Step (a) arises at compile time and involves the definition of the scoping of the COMMON BLOCKS among tasks or subtasks. Steps (b) and (c) occur at execution time and respectively involve dynamically binding COMMON BLOCKS to tasks and scoping of any binding so that it lies nested within a hierarchy of tasks. Step (a) is implemented by scanning the source code for the COMMON BLOCKs and inserting constructs as by way of scoping the blocks and embedding the results thereof in the generated object code. Steps (b) and (c) are responsive to each construct detected in the object code. Step (b) includes dynamically binding at least one COMMON BLOCK to a subtask at the time of task onvocation thereof and recording a pointer to the COMMON BLOCK in the subtask description. Lastly, step (c) updates pointers in the subtask descriptions to the copy of the COMMON BLOCK known to the invoking superior task.

Attributes of Language Extension for Parallel Execution

A FORTRAN language extended for parallel execution typically contains language which permits a main program or task to originate, invoke, and terminate subtasks. It is anticipated that tasks are originated and terminated relatively rarely. However, once originated, tasks are invoked repeatedly. The invocation may be in a form which requires the calling task subsequently explicitly to wait for the subtask to complete. Alternatively, it may be in a form in which the subtask is enabled to complete execution with no explicit wait by the calling task.

FORTRAN programs typically involve the creation, manipulation, and finally deletion of subordinate tasks. Each task is independent. Except for data shared between a calling and a called task, and except for files manipulated jointly by two tasks, the execution of one task is independent of and cannot affect the execution of another task.

The specification of data to be shared may be either implicit or explicit. The specification may be static invention provides an explicit, dynamic, executable specification for the sharing of COMMON BLOCKs. Only data so specified, and specified explicitly at the point where parallel tasks are assigned work, can be manipulated by more than one task. This provides a convenient, secure mechanism for partitioning parallel programs. It also provides a mechanism for encapsulating parallel programs to permit their use by other programs without requiring knowledge by both sides of the internal processing performed by the other side.

Language Extensions

Language for the parallel execution of FORTRAN may be categorized either as in-line language extensions or out-of-line language extensions. In-line language is oriented to the statements within a subprogram and enables parts of a subprogram to execute cooperatively in parallel. In contrast, out-of-line language is subprogram-oriented and enables called subprograms, and any subprograms they may call, to execute independently in parallel.

In-line Language Extensions

The extensions of interest include PARALLEL LOOP and PARALLEL CASES. Other extensions are described, where needed, to facilitate support of the primary statements. These extensions bear a resemblance to the DO-ACROSS or DO-ALL extensions to be found in some prior art descriptions.

Referring now to FIG. 1, there is shown an example of a PARALLEL LOOP statement. The PARALLEL LOOP statement directs that all iterations of the loop over the statements down to and including statement 100 may be performed in parallel. The "index", "iinit", "iterm", and "iincr" values are well-known DO-loop definition values.

The PRIVATE statement facilitates support of the primary statement because it specifies that some scalars are to be manipulated and maintained at each of the processors which participate in the execution of the loop. Such local or private variables are necessary where each processor must maintain its own state.

The DOFIRST statement is optional. It exists to delimit a group of statements to be executed by a processor before it begins execution of any iterations of the loop. Typically, a processor would use DOFIRST to initialize its own state with the associated statements.

The DOFINAL statement is likewise optional. It exists to delimit a group of statements to be executed by a processor when no more iterations of the loop remain available for it to execute. Typically, a processor would use DOFINAL to transfer any accumulated processor-private variables to the permanent variables of the surrounding subprogram.

Both DOFIRST and DOFINAL statements may have a LOCK designation appended to ensure that only one processor at a time is executing within the locked statements. This enables a secure update of information which is not private to the processor.

Lastly, the DOEVERY statement delimits the statements which comprise the traditional body of the DO-loop. These statements are executed for each iteration of the loop by an arbitrary one of the processors participating in the In FIG. 1, the variable SUM is private for each processor executing the loop. In this example, each processor initializes its sum to zero. All of the processors then compete for iterations of the loop. When they execute the loop, they add to their private sums while executing. Finally, each processor adds its private partial sum to the global variable TOTAL under control of a lock.

Referring now to FIG. 2, there is shown an example of the PARALLEL CASES statement. This is a second element of the in-line language extensions. The PARALLEL CASES statement authorizes parallel execution of blocks of code. Again, a PRIVATE statement may be used to enable each participating processor to maintain local variables.

Each case may execute independently. A case may, however, optionally postpone its execution until after other preceding cases have completed. A list of cases, as exemplified in FIG. 2, shows how any acyclic graph of groups of statements may be rendered into a counterpart of case statements. Each case statement includes a list of other case statements upon which it has dependences. Cases are executed when all dependences have been honored.

The compiler translates the cases within a PARALLEL CASES statement in an order designed to minimize elapsed execution time. The compiler accomplishes this by first identifying the longest execution path specified by the chain of waiting-for-cases clauses and the time required to execute each of the cases. The compiled code, when running, causes the paths to begin executing in an order such that the one requiring the longest time begins first. In this manner, the time required dynamically to execute the path is likely to be minimized. Other shorter paths begin execution as soon as processors become available.

Referring again to FIG. 2, each case is presumed to contain FORTRAN statements such as straight-line code, nested loops, or nested cases. In the illustrated code fragment, Cases 1, 2, 3, 6, 7, and 9 begin execution immediately. Case 4 begins execution only after Cases 1 and 2 have completed. Likewise, Case 5 begins execution only after Cases 1 and 3 have completed. In turn, Case 8 must await completion of Cases 5 and 7.

Referring now to FIG. 3, there is shown a standard FORTRAN DO-loop. In this situation, where automatic parallelization is indicated to the compiler, the compiler uses dependence analysis in order to ascertain which loops among a set of nested loops are suitable for transcription to either PARALLEL LOOP or PARALLEL CASES statements. The prior art teaches that DO-loops may be translated into parallelized loops. It does not teach that parallelized cases are equally possible translations.

Referring now to FIGS. 4-6, there are shown alternate translations of the DO-loop of FIG. 3 into PARALLEL LOOPs or PARALLEL CASES, or both. Thus, FIG. 4 exemplifies the DO-loop translated into PARALLEL LOOP, FIG. 5 exemplifies the DO-loop translated into PARALLEL CASES, and FIG. 6 exemplifies a bevy of case statements, each one of which is a PARALLEL LOOP.

Note, for purposes of reduction to practice, the translation is made directly into object code and not into source code. The source code rendition in FIGS. 4-6 is merely illustrative of the cognate syntax.

It should be noted that automatic vectorization can be performed along with automatic parallelization. A single loop may be both parallelized and vectorized, in which case a plurality of processors each execute vector sections from the same loop. Alternatively, outer loops of a set of nested loops may be parallelized and an inner loop vectorized. In this latter circumstance, a plurality of processors may contribute to the execution of the outer loops, but the vectorized inner loop is executed entirely on a single processor for a particular iteration of the parallel outer loops. Further, other loops, neither vector nor parallel, may be interspersed within this nesting of parallel and vector loops. In all of these situations, advantage is taken of the vector execution capabilities of all the available processors as they contribute to the computation of a single parallel program.

The Out-of-line Language Extensions

The out-of-line FORTRAN language extensions permit a task to originate, schedule, dispatch, wait for, and terminate subtasks. The out-of-line extensions are oriented to the execution of entire subprograms in separate data environments, rather than to the execution of statements within a subprogram within its current data environment. The out-of-line tasks may, of course, include in-line constructs.

Referring now to FIG. 7, there is shown an illustrative example of the use of out-of-line language. The program initially originates a group of tasks using the ORIGINATE statement. Each execution of this statement creates a new task with its new data environment, but does not assign any work to the task. It also returns an identifier for the task which, in the example, is stored into the array IDTASK. The program subsequently assigns work to these tasks by executing the DISPATCH statement. The DISPATCH statement is executed once for each element of work intended for execution in parallel. The effect is to assign the item of work to any of the available tasks, waiting if necessary until one of the tasks completes the work assigned previously to it. The first task to complete its currently assigned work will be assigned the next item of work.

Included in the DISPATCH statement is the name of the subprogram to be invoked in the separate data environment. A WAIT FOR ALL TASKS statement is subsequently used to ensure that all of the assigned work has been completed. Finally, the originated data environments are terminated with the TERMINATE statement, freeing storage for reuse.

It is seen, therefore, that tasks must be originated in order to have work assigned to them. Origination merely creates an independent data environment; it is convenient to perform this relatively expensive housekeeping once only so that a much more efficient mechanism may be used to assign work to the data environment. The out-of-line FORTRAN extensions which assign work to the data environment specify what subroutine is to be called within that environment and include:

DISPATCH TASK itask, CALLING subx(arg1,arg2, ...)

SCHEDULE TASK itask, CALLING subx(arg1,arg2, ...)

Any subroutine in the task may be called. Each SCHEDULE statement requires subsequent execution of a corresponding wait statement. A specific form of wait statement, "WAIT FOR TASK itask", permits the synchronization of specific individual tasks. A general form, "WAIT FOR ALL TASKS", simplifies the synchronization of all tasks. In contrast to the SCHEDULE statement, which requires that the invoker of a subtask explicitly wait for its completion and that the subtask remain bound to the invoker until this completion, a DISPATCH statement permits the subtask to complete automatically and requires, therefore, that no corresponding explicit wait statement be executed (WAIT FOR ALL TASKS remains possible).

With these out-of-line language constructs, any FORTRAN routine may employ subtasks. Consequently, a FORTRAN routine may be in a parallel execution mode, and it may still call other routines which also may execute in parallel mode. From this, a library of routines, each of whose members execute in parallel, may be formed.

Dynamic Binding

It is an aspect of this invention that the sharing of COMMON BLOCKs between tasks is made into a dynamic state. This is syntactically accomplished by appending SHARING and COPYING clauses to the out-of-line language constructs SCHEDULE or DISPATCH:

SHARING(common1,common2, ...)

COPYING(common1,common2, ...)

COPYINGI(common1,common2, ...)

COPYINGO(common1,common2, ...)

SHARING specifies that the listed COMMON BLOCKs will be shared during the current SCHEDULE or DISPATCH of the invoked task. Significantly, the same copy of the COMMON BLOCK will be accessed by both tasks. COPYING specifies both that the data in the caller's copy of the COMMON BLOCK will be copied into the called party's copy of the COMMON BLOCK before the schedule or dispatch occurs, and that the data in the called party's copy will be copied into the calling party's copy after the scheduled or dispatched task has completed its execution. It should be apparent that each party has its own private copy of the copied COMMON BLOCK at different locations in memory. Sharing and copying of COMMON BLOCKs may be illustrated by:

SCHEDULE ANY TASK itask,

SHARING(parama,paramb),

COPYINGI(valuea),

CALLING subz

This fragment specifies that two COMMON BLOCKs, "parama" and "paramb", will be shared between an invoking task and the invoked task and, furthermore, that one COMMON BLOCK, namely "valuea", will be copied into the invoked task from the invoking task. These actions are synchronous with the execution of the SCHEDULE statement.

The invoked task may in turn include SCHEDULE or DISPATCH statements in which COMMON BLOCKs are shared with its own subtasks when it schedules or dispatches them. Similarly, the invoked task may include SCHEDULE or DISPATCH statements which copy COMMON BLOCKs into or out of one or more of its subtasks. In both of these cases, the COMMON BLOCKs manipulated by the invoked task could be COMMON BLOCKs shared into it or COMMON BLOCKs not shared into it and therefore private to it.

It should be noted that COMMON BLOCK addresses are dynamically bound during execution. As each subtask is scheduled or dispatched, the pointers to the COMMON BLOCKs in the subtask are dynamically bound during execution. As each subtask is scheduled or dispatched, the COMMON BLOCK pointers in the subtask are updated as needed to point to the local copy of the COMMON BLOCK in the subtask or, when the COMMON BLOCK is shared, to point to the copy of the COMMON BLOCK known to the invoking task. In this latter case, the COMMON BLOCK copy could be private to the invoking task, or it could have been shared with the invoking task by the task which in turn invoked it.

The aforementioned permits a task to have complete control over the sharing of data between itself and the subtask concerned at each point where a task invokes parallel execution in a subtask. As a parallel to the situation where a standard subroutine call binds an argument list only for the duration of the call, the dynamic binding, as an aspect of the method of this invention, binds the communication of the COMMON BLOCKs only for the duration of the schedule or dispatch of the task. Similarly, just as different subroutines may be called with different arguments, or the same subroutine may be called at different points with different arguments, and just as each argument list is designed for a purpose possibly different from all others, so different schedules or dispatches may be executed with different sharing or copying lists.

By this mechanism, a private COMMON BLOCK used by an invoking task to communicate with its subtasks may be shared with any or all of those subtasks. This makes it useful in controlling the work of the subtasks. But the COMMON BLOCKs used by the invoking task in this manner may remain private to it, so that the operation of other independent tasks does not interfere with the invoking task as it coordinates the work of its subtasks. Indeed, there may exist other independent tasks which are themselves performing similar subtasking, each using its private copy of the COMMON BLOCK to facilitate its own communication with its own subtasks.

Thus, the association between the instance of a COMMON BLOCK and the activations of subtasks is made dynamic. The assumption that the definition of a COMMON BLOCK must be fully global or fully private present in the prior art is found false. And, as a consequence, nesting of parallel execution becomes possible, with each level of execution able independently to communicate with its sublevels through COMMON BLOCKs.

Aspects of Parallel Execution and Integrating In-line and Out-of-line Code

The above-described extensions of FORTRAN permit specification or designation of parallel processing in otherwise sequential or straight-line code. The following paragraphs treat aspects of processing of the object code constructs in a shared-memory, multiprocessor configuration.

First, each parallel language construct which identifies a new point of parallel execution causes dynamic creation of an entity designated as a Parallel Work Item (PWI). A PWI is bound to a register set and includes information identifying the point of occurrence of the parallel work, the address of the target instruction stream for parallel execution, and other control information.

Second, a varied number of processors may be employed in the execution of this parallel work. As processors finish one piece of parallel work and are therefore ready to begin another, they pick up the PWI on the top of a queue of PWIs and execute it. The new PWI may be either an in-line or an out-of-line portion of the codestream. This portion may in turn create further parallel work, which results in adding more elements onto the queue of PWIs. At the time execution of a PWI is completed, the PWI is deleted.

One consequence of the language extension constructs is the capacity to create an unbounded or arbitrarily wide amount of parallel work. When an operating system detects this, it arguably could swamp the system if the response to such parallel work is the creation of the traditional resources used to represent candidates for parallel execution within the operating system. Examples of such established mechanisms in the IBM operating systems are task control blocks (TCBs) for the MVS operating system or virtual processors within a virtual machine for the VM operating system. To bind the degree of parallelism and to the desired degree of parallel execution is processed at program initiation. The operating system can modulate this specification to ensure that the degree is less than the system capacity. It may then create TCBs or virtual processors in this degree.

The program assigned to run on these TCBs or virtual processors is the program which examines the queue of parallel work items and executes the top item on the queue. Thus, the degree of parallel execution physically attempted is controlled by the number of TCBs or virtual processors created to process the queue of PWIs. The degree of parallel execution logically possible in the program is represented by this queue of PWIs. At the limit, one processor could be processing each PWI. It should be apparent that the TCBs or virtual processors executing PWIs on behalf of a given program contend with other work in the system for execution on the available real processors. Thus, as other work in the system diminishes, more real processors become available to execute the particular TCBs or virtual processors assigned to the parallel program, and the degree of parallel execution experienced by the parallel program can increase.

While aspects of scheduling work to processors are well understood in the prior art, what is significant here is that all in-line and out-of-line execution, as well as execution spanning multiple levels of parallelism in a program, can be integrated onto this single queue of work. Conflict between data environments is controlled by scoping the sharing of data between environments to conform to the execution structure which dynamically relates these data environments. The execution structure is represented by the creation and deletion of PWIs and their execution from a queue. Consequently, the logical structure of the parallel subtasks and the logical structure of the sharing of data between subtasks are both regulated by the creation and deletion of PWIs and their execution from a queue. The physical execution of work in parallel is regulated by the selection of these PWIs from the queue by any available processor.

Illustrative Example of Reducing Conflict Among Tasks Concurrently Accessing COMMON BLOCKs FIGS. 8 and 9 are an example intended to teach the method of the present invention. It shows how dynamic binding of COMMON BLOCKs reduces conflict between COMMON BLOCKs and increases parallel execution. It also shows how storage requirements for COMMON BLOCKs can be reduced through dynamic binding.

FIGS. 8 and 9 show a main program and two subprograms, EIGEN and SOLVE. Only those fragments necessary to the illustrative example are shown. The main program executes in three main sections:

(1) it computes some invariant initializing data;
(2) it then, for each of N distinct sets of values, reads a set of values and calls subroutine EIGEN to compute some results specific to the set of values; and
(3) finally, after all of the computations have been performed, it reports some computed values representing the output of the program.

Subroutine EIGEN contains three similar sections:

(1) it computes some functions of the matrix for which it was called;
(2) it then calls subroutine SOLVE once for each row of the matrix to compute some additional functions on that row; and
(3) finally, it posts into an output array some summary results representing the output of its computation.

Subroutine SOLVE, in this example, simply computes a function on a row of data.

These routines have been parallelized using a method similar to that shown in FIG. 7. The main program, desiring to call EIGEN in parallel for many independent sets of input values, originates some convenient number of subtasks. In the example, the number is five; it is, in any case, a parameter. These subtasks are dispatched independently and asynchronously so that they execute in parallel. When the main program needs to ensure that all parallel execution is complete so that it may prepare its final output, it executes a wait statement to cause it to wait until all subtasks are complete.

Subroutine EIGEN, in an exactly similar manner, desiring to call SOLVE in parallel to evaluate the rows in its matrix, originates a convenient number of subtasks (three in the example; but in any case, a parameter). The subtasks are dispatched iteratively to execute the rows.

Finally, a wait is executed to ensure that all calls to SOLVE are complete before EIGEN posts its final output.

It should be noted that all of the COMMON BLOCKs are declared to the program as IBM VS FORTRAN dynamic COMMON BLOCKs. This means that physical allocation of storage is deferred for each of these COMMON BLOCKs until a subroutine is entered in which the storage for the COMMON BLOCK is required. Thus, for example, only when the main program begins execution will its three declared COMMON BLOCKs INIT, DATA, and EVAL be allocated.

With the foregoing as an introduction, consider now how program execution develops and how COMMON BLOCKs are dynamically bound during execution. At the beginning, the module containing the main program is loaded by the operating system and execution of the program is begun. When the main program is entered, the prolog will call a library routine to cause COMMON BLOCKs INIT, DATA, and EVAL to be allocated in the main task. Pointers to each of these COMMON BLOCKs within the main program will be updated to point to the actual storage locations allocated. Each of these COMMON BLOCKs is at this point a private COMMON BLOCK within the main task.

DO-loop 10 computes the arrays H, T, and P into the freshly allocated storage for COMMON BLOCK INIT. These arrays, dynamically computed during execution, are nonetheless in the illustration invariant over all calls to EIGEN and SOLVE. The data has been computed into the COMMON BLOCK INIT which is owned by, and now is private to, the main task.

DO-loop 20 then originates five subtasks. No work is assigned to the subtasks at this point and, since the COMMON BLOCKs in the subtasks are declared to be dynamic COMMON BLOCKs and since no routines have executed in the subtasks to require their storage to be allocated, no storage is allocated for the COMMON BLOCKs. The pointers to COMMON BLOCKs in the separate data environments for the separate subtasks remain pointing, unupdated, to zero.

DO-loop 30 then executes, performing one iteration for each of the independent sets of values for which computation is to be performed. The loop begins by reading a set of values into the arrays X and Y in the main program private COMMON BLOCK DATA. It then computes the further matrix AVAL in this private COMMON BLOCK. At this point, the arrays X, Y, and AVAL are ready for further computation by subroutine EIGEN.

The main program now wishes to call subroutine EIGEN in parallel. It wishes to transfer to EIGEN this specific set of values for X, Y, and AVAL in order to leave its private COMMON BLOCK DATA ready for computing the next set of values. It further wishes to make the parallel subtask which will execute EIGEN capable of accessing all of the initialized invariant data precomputed into the COMMON BLOCK INIT. Finally, the main program wishes to make the parallel subtask capable of accessing the existing main program copy of COMMON BLOCK EVAL, since it is in this location that the main program will expect to find the result produced by the execution of EIGEN.

These steps are all accomplished by the DISPATCH statement illustrated:

DISPATCH ANY TASK ITASK,

* SHARING (INIT,EVAL),

* COPYINGI(DATA),

* CALLING EIGEN(=K)

This DISPATCH specifies, first, that the COMMON BLOCKs INIT and EVAL known to the invoker (the main program) are to be shared with the invoked subtask (the one which will execute EIGEN for this set of data). The operation of sharing requires that pointers in the subtask to these two COMMON BLOCKs be made to point to the location of the COMMON BLOCK in the invoking task.

Had the COMMON BLOCKs in the subtask been declared as subtask would be known after the program was loaded into memory by the standard mechanisms used in linkage editors and program loaders when they perform relocation. In this case, the pointers would presently be pointing at the static private copy of the COMMON BLOCKs in the subtask. Also in this case, the pointers would be adjusted to point to the copy of the COMMON BLOCK known to the invoking task (in the example to the storage allocated for the dynamic COMMON BLOCK when the main program prolog was executed). Note that in this case, however, storage would have been allocated for static private copies of these COMMON BLOCKs in the subtask even though, in the illustrated program, these static private copies in the subtask would never be referenced.

In fact, however, the COMMON BLOCKs are declared as dynamic in the subtask. In this case, the operation of sharing requires simply that a record be made of the fact that the specified COMMON BLOCKs presently are shared. When the subroutine EIGEN prolog subsequently attempts to allocate these dynamic COMMON BLOCKs, the attempt to allocate will be deflected. Instead of allocating storage for the COMMON BLOCKs and updating the pointers within EIGEN to point to the allocated storage, a library routine will simply update the pointers within EIGEN to point to the private copy of the COMMON BLOCK created for the main program and shared into EIGEN for its present dispatch. No private copies of the COMMON BLOCKs will have been allocated.

Whether specified as static or dynamic, however, subroutine EIGEN will access the shared COMMON BLOCKs through the pointers within EIGEN updated to point to the main program copy of the COMMON BLOCKs.

The illustrated DISPATCH statement specifies, secondly, that the COMMON BLOCK DATA is to be copied from the invoker (the main program) into the invoked subtask (the one which will execute EIGEN for this set of data). This requires that a private copy of the COMMON BLOCK exist within the subtask. If the COMMON BLOCK is static, the copy already exists; if the COMMON BLOCK is dynamic and not already allocated as a consequence of a preceding requirement to allocate it, then a copy of the COMMON BLOCK for the subtask is allocated in preparation for copying. Pointers within the subtask are updated to ensure that they point to the private copy of the COMMON BLOCK. Data is then copied between the two tasks.

Finally, having updated pointers to address the proper copy of each of the COMMON BLOCKs for this dispatch, the subtask is entered at entry point EIGEN and permitted to execute asynchronously. If the computer system has more than one processor available for execution of the program, then true parallel execution of the subtask may begin.

In the illustrated example, one argument is passed to EIGEN: the index K of its assigned one of the N data sets, which will be evaluated by the main program. EIGEN will use this index in order to place its computed result into the corresponding locations of the N element vector EVEC and of the N-by-N element matrix EMAT in the shared COMMON BLOCK EVAL. It is necessary that the value of this index K, and not the location of the word containing K, be passed to EIGEN as an argument, since the main program will continue execution and likely will update K before its use in EIGEN. This requirement to pass a value rather than an address is illustrated by the syntax "=K".

On the sixth iteration of DO-loop 30, it is possible that, since only five tasks were originated, no task is immediately available on which to perform the DISPATCH. In this case, the main program will wait until one of the dispatched subtasks completes. At that time, the main program will restart and continue.

After DO-loop 30, at Statement 40, a WAIT FOR ALL TASKS is executed to ensure that all subtasks have completed. Finally, at Statement 50, the data computed by the subtasks into the arrays EVEC and EMAT, both lying within the COMMON BLOCK EVAL shared into the subtasks by the dispatch statements, is written.

The main program has, in this example, decided that it can best accomplish its work with 5-way parallel execution of EIGEN. It has shared two COMMON BLOCKs into the subtasks. It has caused data to be copied into a third COMMON BLOCK private to each of the subtasks.

Consider now the processing in subroutine EIGEN. As indicated above, the flow of logic is substantially similar to that in the main program. It will therefore not be described in detail, but it is important to note one difference. Each subtask EIGEN is operating with a separate and private copy of the COMMON BLOCK DATA containing the values on which it is to operate. These subtasks have decided that they can best perform their computation by employing further subtasks. Each needs to share the data within its private COMMON BLOCK DATA with its own further subtasks. Each must know, however, that this data is not subject to alteration by any other subtasks.

The COMMON BLOCK DATA, therefore, must be private to subroutine EIGEN, but each subroutine EIGEN must be able to share DATA with its own subtasks executing SOLVE. This is accomplished under the present invention by the illustrated DISPATCH statement within EIGEN:

* SHARING (INIT,EVAL,DATA),

* CALLING SOLVE(=K,=J)

This statement specifies that the three COMMON BLOCKs known to EIGEN be further shared into a dispatched subtask. One of the subtasks of this EIGEN is selected. Pointers in this selected subtask are updated to point to the copies of the COMMON BLOCKs known to EIGEN. For two of the COMMON BLOCKs, INIT and EVAL, these copies will be the COMMON BLOCKs which were in turn shared into EIGEN by the main program. For the third, DATA, the copy will be the private copy of the COMMON BLOCK known to EIGEN. The logic of this update, whether dynamic or static, is identical to that described above when EIGEN was dispatched.

After these dispatches, it should be clear that all of the subtasks executing SOLVE for all of the subtasks executing EIGEN are able to fetch from and store into the COMMON BLOCKs INIT and EVAL allocated for the main program, and that only one copy of these two COMMON BLOCKs exists. Likewise, it should be clear that six copies of the COMMON BLOCK DATA exist: one in the main program and one in each of five subtasks executing EIGEN. Finally, it should be clear that each SOLVE subtask is able to access the copy of DATA owned by the EIGEN subtask which dispatched it.

Each EIGEN, in summary, was able, pursuant to this invention, to be given private data, to decide to execute in parallel, and to share that private data with its subtasks. This was not possible with fixed global or fixed private specifications for data. EIGEN, in consequence of this invention, can become an element of a library capable of exploiting parallel execution and capable of being called from parallel as well as nonparallel regions.

If, in conformance with the prior art, a COMMON BLOCK could be only completely global or only completely private, two possibilities could be observed. Both indicate the nature of conflict caused by the lack of dynamic binding in the prior art. On the one hand, COMMON BLOCK DATA could have been treated as global. In this case, the operations of one execution of EIGEN would have to be interlocked against every other execution of EIGEN. In this case, in other words, only one copy of EIGEN could execute at one time, and the parallelism programmed in the main program would not be achievable. The main program is rendered serial and the only parallelism retained is that within EIGEN. A single level of parallel execution results.

A second possibility is to make COMMON BLOCK DATA completely private. This means that no EIGEN subtask can share its COMMON BLOCK with its SOLVE subtasks. It could choose to pass the elements of the COMMON BLOCK DATA as arguments, calling SOLVE with a longer parameter list. In practice, however, this is extraordinarily burdensome on a programmer. COMMON BLOCKs may have hundreds of declared variables and arrays in them. To write lists of this sort, to keep them synchronized as programs are maintained, is to produce programs which are extremely difficult to diagnose and maintain. Indeed, one purpose of COMMON BLOCKs is to collect a disparate group of data elements into one named entity so that they all may be treated as a whole. To argue that its distinct private elements could be shared as arguments to a subtask, but that as an integral intact entity the private COMMON BLOCK cannot be shared with a subtask, is to argue strongly for an invention to solve this problem.

In the foregoing example, it was seen that the combination of the VS FORTRAN dynamic common allocation mechanism and the invented dynamic common binding mechanism yields a savings in the storage allocated for COMMON BLOCKs in the presence of parallel execution and common sharing. In particular, when a subtask has a COMMON BLOCK specified as dynamic common and when a superior task shares that COMMON BLOCK into the subtask, it is not required to allocate storage for the COMMON BLOCK in the subtask, even though the subtask is fetching and storing elements of the COMMON BLOCK. By causing the pointers in the subtask to be updated to point to the COMMON BLOCK allocated for the superior task (or to the copy of the COMMON BLOCK transitively shared into the superior task), the fetching and storing is done directly into the copy of the COMMON BLOCK shared into the subtask.

The foregoing example, for clarity, illustrated each of the EIGEN subtasks originating and dispatching its own set of SOLVE subtasks. This is not strictly necessary. A pool of such subtasks could have been created by the main program. Each EIGEN would select available SOLVE subtasks from the pool. EIGEN is capable, under this invention, of sharing into its selected subtask the COMMON BLOCKs required to communicate the necessary data to the subtask. Thus, it is not required that a private group of subtasks be allocated. This too results in the saving of storage.

The illustrative example of FIGS. 8 and 9 shows how COMMON BLOCKs may be bound dynamically to conform to the dynamic execution structure of a parallel tasking system. It shows only one particular instance of programming which becomes possible with this mechanism. When computations are designed to be performed with multiple layers of parallel processing, the necessity of the mechanism becomes clearer and clearer.

Implementation Aspects

In the FORTRAN compiler, it is necessary to recognize and process the extended language statements. The compiler must be modified to parse, tokenize, translate to intermediate language, possibly optimize, and finally translate to executable code sequences the new language statements. Much of this process is well understood in the prior art.

The new out-of-line language statements may be translated to and processed as calls on new functions added to the FORTRAN library. Some of these translations are simple; WAIT FOR ALL TASKS, for example, easily is translatable to a call on a routine in the library designed to execute a wait for all tasks. Others are more complex. A translation of a SCHEDULE statement, with its optional clauses including (but not restricted to) SHARING, COPYING, COPYINGI, and COPYINGO, as well as its mandatory clause CALLING, can be translated either into a single call to a library routine with a very complex argument list or into a series of calls to different library routines, each performing the processing associated with one component of the statement and each with a simple argument list.

A routine to implement SHARING, for example, would be provided with a list of the COMMON BLOCKs specified in the SHARING clause of the source program. A clause such as

"..., SHARING(A,BB,CCC), ..."

could be translated into

"CALL PTSHAR(A,BB,CCC)".

Such translations from the compiler's perspective simplify dealing with the new language extensions.

The out-of-line programming extensions are preferably embodied in new language statements, and not in a series of subroutine calls, for several reasons.

First is the totality of the very complex and very variable argument lists required to describe the internal execution of a process, such as dispatch, with all its options. A programmer would be overwhelmed by a multiplicity of operands not relevant to the parallel algorithm being programmed but, instead, to the details required internally to support it.

Second, when a process such as schedule is described in a single statement, the compiler is able to examine the entire statement and diagnose errors which otherwise would be difficult to detect. Error detection otherwise would require correlation of independent subroutine calls across multiple statements interspersed with possibly unrelated statements.

Third, items such as the character names of COMMON BLOCKs would require special delimiters if passed as arguments, adding to the programmer's burden and obscuring further the programmer's intent. When embedded in language, such delimiters are not required. SHARING(A,BB,CCC) is easier to write and read, and mentally evaluate than CALL PTSHAR('A','BB','CCC').

Fourth, the compiler has available to it and may pass to the library information which is difficult for a programmer to discover or maintain. An example is the total length in bytes of a COMMON BLOCK containing arbitrary arrays and scalars, even more so when the dimensioning for the arrays is supplied by parameter statements or by included files during compilation.

Fifth, it is illegal in FORTRAN for a programmer to call a subroutine with different numbers of arguments in different places. If a programmer were forced to write a call in order to list COMMON BLOCKs for sharing, for instance, the call would always have to have the same number of arguments, and this is not at all helpful to the need to list different sharings at different places. The compiler and library internally are not bound by such a restriction.

The in-line language extensions impose a greater burden on the compiler. The compiler must recognize the new PARALLEL LOOP structure, for example, and record internally the statements which exist in each of its three sections (DOFIRST, DOEVERY, and DOFINAL). It must insert new code and reorder the existing code to yield an execution structure which accomplishes the following:

Initialize the number of iterations;
Compute the number of processors profitably usable on the loop;
For each such processor:
  obtain and initialize a parallel work item, execute the DOFIRST section (under lock if specified);
  Until all iterations have been obtained, obtain the next iteration (or chunk of iterations), execute the DOEVERY section for the iteration (or chunk);
  execute the DOFINAL section (under lock if specified), release the parallel work item;
Wait until all processors are complete.

It is clear that there is much more logic present than there was for a simple DO-loop. However, it should also be clear that each part of this structure can be represented internally with variants of normal assignment statements, conditional branch statements, library routine calls, and other similar mechanisms. The locking mechanism for DOFIRST and DOFINAL, for example, can be translated by inserting a call to a library lock-locking routine at the beginning of the section and by inserting a call to a library lock-freeing routine at the end of the section. Performance and convenience govern the manner of such translation.

The discussion regarding the benefit of natural language over subroutine call sequences for out-of-line language applies, with possibly even greater force, to the in-line language as well.

The primary exception to the ability to modify existing internal processing to support a PARALLEL LOOP is the logic which obtains the next iteration (or chunk of iterations) to execute. This number is global to all processors executing the loop. Rather than a simple sequence which performs a load, add, and store of the iteration number, which, if executed simultaneously by more than one processor, permits duplicate indices to be obtained, it is necessary to compile instruction sequences which employ instructions such as compare-and-swap so that each index value is obtained once and only once.

Once a PARALLEL LOOP construct exists, it is simple to construct a PARALLEL CASES construct. The structure

| PARALLEL CASES |
| --- |
| CASE 1 |
| (code for case 1) |
| CASE 2 |
| (code for case 2) |
| CASE 3, WAITING FOR CASES(1) |
| (code for case 3) |
| CASE 4 |
| (code for case 4) |
| CASE 5, WAITING FOR CASES(2,3) |
| (code for case 5) |
| END CASES | for example, clearly should be seen to be equivalent to the structure

```
        PARALLEL LOOP 9 I = 1,5
            GOTO (1,2,3,4,5), I
1       (code for case 1)
        CALL CASE_IS_DONE(1)
        GOTO 9
2       (code for case 2)
        CALL CASE_IS_DONE(2)
        GOTO 9
3       CALL IS_CASE_DONE(1)
        (code for case 3)
        CALL CASE_IS_DONE(3)
        GOTO 9
4       (code for case 4)
        GOTO 9
5       CALL IS_CASE_DONE(2,3)
        (code for case 5)
        GOTO 9
9       CONTINUE
``` where the calls are to library routines to note that cases are done when others possibly can wait for them, and to wait for cases which must be done before a given case executes. The numbering shown in the loop form is for illustration only; the numbers used in the case statement are internalized and do not conflict with user statement numbers. The PARALLEL CASES statement therefore can be translated into the same execution structure as the PARALLEL LOOP statement. It requires additional checking, however, to ensure the consistency of the case numbering (no duplicates) and of the case waiting (no deadlocks).

Finally, automatic parallelization employs dependence theory to ascertain where loops may be executed in parallel. As mentioned earlier, this theory is now reasonably well understood in the prior art. The loops for which parallel translation is desired can be cast into the form illustrated for the programmer-written parallel loop.

Underlying all of these translations will be the library routines which are called from the compiled code. Illustrative are the following for the in-line language:

(a) PDFORK: compute the number of processors profitable to use on the loop; obtain and initialize parallel work items for them as processors become available; return for each of these loop-execution PWIs to the compiled loop-execution code beginning with a call to PDINIT; return for the code which called PDFORK to the compiled loop-completion code beginning with a call to PDJOIN.

(b) PDINIT: initialize the PWI for executing a loop; update pointers to address the processor-private variables; obtain any vector save areas required.

(c) PDTERM: release the PWI for executing a loop; free any vector save areas obtained; note in the parent that the PWI is complete.

(d) PDJOIN: wait until all PWIs allocated for the loop have completed.

(e) PDLOCK: lock the lock associated with the loop (for DOFIRST and DOFINAL).

(f) PDFREE: free the lock associated with the loop (for DOFIRST and DOFINAL).

(g) PCPOST: mark that a particular case has been completed.

(h) PCWAIT: wait until a list of cases has been completed.

For the out-of-line language, as described earlier, the support library routines may be simple or complex. Illustrative are the following routines which might be called in support of the statement

"DISPATCH ANY TASK ITASK, SHARING-(A,BB,CCC), CALLING X(Y,Z)":

(a) PTTAKE: find an available task, waiting if necessary until one completes; mark it as owned by the calling task; return its name to the programmer in the variable ITASK.

(b) PTSHAR: find records describing the listed COMMON BLOCKs in both the calling and called tasks; mark the listed COMMON BLOCKs for dynamic binding in the called task to the caller task.

(c) PTEXEC: examine the COMMON BLOCKs in the called task to ensure that they are correctly dynamically bound; relocate those not shared on this call to point to their private location;
relocate those shared on this call to point to the location of the COMMON BLOCK in the caller task; perform any copying specified;
find the called subroutine in the called task; prepare a copy of the argument list; invoke the called task at the called subroutine.

Additional routines are used to ensure, before a task completes, that all of its subtasks are complete; to perform any copying back specified when the subtasks were scheduled or dispatched; and to perform similar functions deemed part of invoking and completing a subtask.

We claim:

1. A computer implemented method performed within a multi-processing, multi-programming computer environment for reducing conflict among tasks concurrently accessing COMMON BLOCKs in code sequences compiled within said environment from a FORTRAN like language system, and for reducing the memory used in the storing of private copies of said COMMON BLOCKs, activations of tasks being nestable, comprising the computer implemented steps of:

at compile time of:

(a) inserting constructs into the compiled code sequences by a FORTRAN compiler portion of said language system defining the scoping of one or more COMMON BLOCKs among concurrent tasks of subtasks at execution time; and at the execution time of:

(b) responsive to each inserted construct in the compiled code sequences by dynamically binding the COMMON BLOCKs to the tasks, and (c) scoping the binding so that it lies within a dynamic nesting of the tasks.

2. A computer implemented method performed within a multi-processing, multi-programming computer environment for reducing conflict among tasks concurrently accessing COMMON BLOCKs in code sequences compiled within said environment from a FORTRAN like language system, and for reducing the memory used in the storing of private copies of said COMMON BLOCKs, activations of these tasks being nestable, said COMMON BLOCKs including data such as variables and arrays, tasks involved as a consequence of executing the compiled code sequences include the capability of calling other tasks or sub-tasks, comprising the computer implemented steps of:

a compile time:

(a) inserting constructs into the compiled code sequences by a FORTRAN compiler portion of said language system defining the scoping of one or more COMMON BLOCKs to be processed among concurrent tasks or subtasks at execution time; and at execution time:

(b) responsive to each inserted construct in the compiled code sequences as invoked by dynamically binding at least one COMMON BLOCK to a sub-task at the time of initial sub-tasks invocation as specified by a superior task including recording a pointer to said COMMON BLOCK in the sub-task description; and (c) updating pointers in the sub-tasks to the location of the copy of the COMMON BLOCK known to the invoking superior task.

3. The method according to claim 2, wherein the step of dynamically binding includes the steps of:

(b1) detecting constructs in the compiled code sequences specifying that preselected COMMON BLOCKs are sharable among concurrent tasks or sub-tasks during the current schedule or dispatch of a counterpart invoked task;

(b2) detecting constructs in the compiled code sequences specifying that (1) data in a copy of the COMMON BLOCK declared by a calling task will be copied into a copy of the COMMON BLOCK declared by a called task before the schedule or dispatch of the called task occurs, and, that (2) data in the copy of the called task will be copied into the copy of the calling task after the scheduled or dispatched task has completed its execution, and (b3) responsive to the detection of said constructs, rendering said COMMON BLOCKs accessible as specified, and copying the contents to ensure consistency as specified.

4. The method according to claim 3, wherein the step of detecting constructs as specified in step (b1) further includes the steps of detecting constructs specifying that preselected COMMON BLOCKs are sharable among the sub-tasks of the currently involved task originally declaring the COMMON BLOCKs.

5. The method according to claim 2, wherein said method comprises the further steps of:

(d) detecting a construct in the compiled code sequence specifying the degree of parallel processing to which the system executing said compiled code sequence should be responsive;

(e) detecting constructs in the compiled code sequences indicative of either in-line parallel processing oriented towards parallelism in DO-loops or out-of-line processing oriented towards parallelism in sub-tasks; and (f) responsive to the detection of said constructs, causing the indicated functions to be processed in a parallel manner up to either the specified degree or the capacity of the system, whichever is less.

6. The method according to claim 5, wherein the in-line processing constructs include PARALLEL LOOP and PARALLEL CASES, and wherein the out-of-line processing constructs include SCHEDULE TASK, DISPATCH TASK, and CALLING.

* * * * *

UNITED STATES PATENT AND TRADEMARK OFFICE
CERTIFICATE OF CORRECTION

PATENT NO. : 5,093,916

DATED : March 3, 1992

INVENTOR(S) : Alan Karp, Randolph Scarborough, Alfred Shannon, Jin-Fan Shaw, Leslie Toomey It is certified that error appears in the above-identified patent and that said Letters Patent is hereby corrected as shown below:

Column 4, Line 66, "IBE" should read "IBM"

Column 4, Line 67, "Amdhl" should read "Amdahl"

Column 7, Line 19, After "participating in the" insert --execution of the loop.--

Column 14, Line 16, After "declared as" insert --static COMMON BLOCKs, the location of all pointers in the--

Column 15, Line 56, "statement within EIGEN:" should read, ANY TASK ITASK,"

Column 22, Line 28, "involved" should read "invoked"

Signed and Sealed this

Thirtieth Day of November, 1993

Attest:

BRUCE LEHMAN

Attesting Officer

Commissioner of Patents and Trademarks